United States Patent

[11] 3,583,684

| [72] | Inventor | Heinz Schippers |
| | | Remscheid-Lennep, Germany |
| [21] | Appl. No. | 825,333 |
| [22] | Filed | May 16, 1969 |
| [45] | Patented | June 8, 1971 |
| [73] | Assignee | Barmag Barmer Maschinenfabrik Aktiengesellschaft Wuppertal, Germany |
| [32] | Priority | May 16, 1968 |
| [33] | | Germany |
| [31] | | P 17 78 605.9 |

[54] MIXING AND REACTION EXTRUDER
10 Claims, 10 Drawing Figs.

[52] U.S. Cl. ..................................................... 259/105
[51] Int. Cl. ..................................................... B01f 7/00
[50] Field of Search.......................................... 259/105, 109, 110, 9, 10, 6, 21, 41, 64

[56] References Cited
UNITED STATES PATENTS

| 2,576,995 | 12/1951 | Carvel | 259/9 |
| 2,793,847 | 5/1957 | Steele | 259/105X |
| 3,214,147 | 10/1965 | Wakeman et al. | 259/105 |
| 3,304,062 | 2/1967 | Frechtling | 259/10 |
| 3,476,523 | 11/1969 | Leybourne | 259/9X |

Primary Examiner—Jordan Franklin
Assistant Examiner—George V. Larkin
Attorney—Johnston, Root, O'Keeffe, Keil, Thompson and Shurtleff ABSTRACT: Screw presses for the continuous execution of mixing, homogenizing and reaction processes for flowable, and especially for viscous, materials or mixtures of materials, characterized by at least one screw with a conveying and an adjoining mixing zone in an essentially cylindrical screw passage wherein a helical dividing wall provided with holes, slits or similar perforations is arranged between the webs or flights of a screw or in the hollow end of a screw shaft, the radial distance of said dividing wall from the adjacent portion of the screw core on the one hand and from the internal wall of the cylindrical screw passage on the other hand being variable in the longitudinal direction of the screw or web spiral, and which divides the screw thread into an internal and an external passage of varying depth or cross section in said longitudinal direction.

PATENTED JUN 8 1971

INVENTOR
HEINZ SCHIPPERS

BY
Johnston, Root, O'Keeffe, Keil, Thompson & Shurtleff
ATTORNEYS

PATENTED JUN 8 1971

INVENTOR
HEINZ SCHIPPERS

BY
Johnston, Root, O'Keeffe, Keil, Thompson & Shurtleff
ATTORNEYS

MIXING AND REACTION EXTRUDER

In the preparation of thermoplastic resins, as in the case for example of the admixing of pigments and additives, as well as in the mixing of several components of a flowable or viscous substance, intensive, thorough mixing and homogenizing of these substances are required. Inadequate mixing causes, in the case of extrusions, differences of thickness and variations in the quality of the extruded material, often accompanied by a rough, nonuniform surface. As a result, both the strength characteristics and the appearance of the final product are impaired appreciably.

According to methods known in the art, the mixing and homogenizing of a viscous mixture of various substances may be carried out in screw presses endowed with special mixing and homogenizing zones between the screw input and output. For this purpose screws with alternate thread pitch or with sections having an opposite thread direction are known in the art, as are screws having sections devoid of thread. Furthermore, screws are also used in which threads of small and large pitch are superimposed on one another in the same section, or which are provided with rudiments of corresponding threads as, e.g., baffles or kneading cams. In addition to these mixing devices, there is also a mixing device constructed according to German Pat. No. 1,200,788, in which the mixing and the conveying processes take place independently of one another.

A satisfactory mixing of the conveyed material is brought about in a simple manner by changing over to smaller thread depths, with a corresponding increase in the screw core diameter. Small depths produce a strong shearing effect and thereby lead to an intensive mixing of the substances to be homogenized. However, in the case of small screw thread depths, the amount of substance conveyed is limited unless an unusually large screw diameter is used.

BRIEF DESCRIPTION OF THE INVENTION

The primary objective of the present invention is to obtain a thorough mixing and homogenization of the conveyed material when a relatively large amount of material is conveyed by a screw of small core diameter. The flow of viscous substances takes place generally in a laminar manner, and the invention herein provides screw press improvements attained by superimposing on the main direction of flow of the material, by means of special devices, a movement of screw-conveyed material whose direction is essentially perpendicular to that of the main flow. This endows the laminar flow with turbulent characteristics and in this way ensures an intensive and thorough mixing.

In accordance with the present invention, there is provided in the screw press a mixing zone wherein, between some of the webs or flights of the main or an auxiliary screw, a helical dividing wall provided with holes, slits or similar perforations is mounted. The radial distance of said wall from the core of the main screw or an auxiliary screw on the one hand and from the internal wall of the cylindrical screw passage of the mixing zone on the other hand varies in the longitudinal direction of the screw. The helical dividing wall divides the screw thread into an internal and an external passage. The transverse cross sections of each passage are nonuniform. The passages are interconnected through the holes or slits in the dividing wall. In this way, a substantial portion of the material to be homogenized is forced, while flowing through the mixing zone, to flow through the openings in the dividing wall and passes alternately from the internal into the external and from the external into the internal passage. The conveying of the material in the direction of the main flow in the screw press is only slightly retarded. The radial movement of the flowable or viscous substance leads to the desired intensive through and through mixing.

The passage between the dividing wall and the screw core, i.e., the internal passage, is accessible for solid substances, such as cleaning devices, only at the beginning and end of the mixing zone in the direction of the thread spiral. Even there, it is accessible only with difficulty. It may be found advantageous that in the region of the mixing zone the screw core and/or the helical screw webs or flights with the helical dividing wall are segmented and separable from one another via a detachable joint. The screw core and/or screw web or flight of the conveying zone portion of the main screw is connected with the corresponding screw part of the mixing zone at the beginning of the mixing zone in this detachable manner. This arrangement facilitates the easy cleaning of the screw core and of the internal side of the dividing wall in the mixing zone. The perforated, helical, divider wall may be a separate piece which is fixedly mounted on the helical flights or webs of the main screw, or it may be mounted in the mixing zone on a hollow, auxiliary screw adapted to rotate independently of the main screw. Still further, the perforated, helical divider wall may be provided in the enlarged, hollow end or extension of the screw, preferably between the helical flights or webs of an enlarged, conically flaring, hollow end or extension.

If the introduced material is not yet viscous, the conveyance thereof through dividing walls of the mixing zone is not too feasible, especially since these walls would exert an unfavorable effect on the building up of pressure. For this reason the screw webs or flights are constructed at the upstream, conveying portion of the screw without a dividing wall at first, in order to build up the pressure at that point. In the adjoining mixing zone, which is provided with a perforated dividing wall, the viscous material is further conveyed axially of the screw and is mixed via turbulence generated by cross and/or counterstreams, generally without any further buildup of pressure.

In a further embodiment of the invention the screw core of the mixing zone may be an auxiliary core or screw, which is separated from both the main screw core of the conveying zone and a hollow, perforated wall-bearing screw flight in the mixing zone, the latter surrounding the auxiliary core or screw. The latter may be arranged in an independently rotatable manner and driven on the output side. Through the relative rotation between the auxiliary core or screw, and the hollow screw flight, an additional intensive mixing of the material to be mixed and homogenized is attained.

An even more intensive mixing and homogenizing effect may be attained if, according to the invention, a central screw is surrounded in the region of the mixing zone by a hollow web or flight spiral having a thread whose direction is the same as or opposite to the spiral thread of the central screw and wherein, between the webs of said web spiral, a correspondingly helical dividing wall with holes, slits or similar perforations is arranged with the radial distance of the dividing wall from the related core section of the central screw on the one hand and from the internal wall of the cylindrical screw passage of the housing on the other hand, may be varied in the longitudinal direction of the screw. The hollow web spiral together with the helical, perforated dividing wall is arranged in a rotatable manner and driven on the input or output side. In the case of a drive on the input side, the web spiral together with the intermediary dividing wall is constructed as the extension of a tubular jacket which surrounds the central screw in the region of the conveying zone, similarly to an ordinary extruder cylinder, to make it possible to develop the required conveying pressure in the plasticized mass. In the region of the filling tube of the screw press, the tubular jacket exhibits windowlike perforations which clear the path for the passage of the raw material toward the conveying screw. The driving torque is transmitted, through the ribs between the windowlike perforations, to the tubular jacket and to the adjoining web spiral. When the web spiral is driven on the output side, the tubular jacket may end before the beginning of the filling tube.

Equally good results are achieved if, according to the invention, the screw core ends at the beginning of the mixing zone, and the web spiral of the mixing zone is connected with the screw core of the conveying zone by means of the perforated dividing wall. The latter divides the screw thread formed by the web spiral into an internal and an external passage, whereby both the inside and the outside diameter of the web spiral are increased compared with those of the web of the conveying zone. The perforated dividing wall forms a conical or bell-shaped enlargement into which extends a second screw coaxial or nearly coaxial with the first screw. The thread of said second screw acts together with the web of the internal passage of the web spiral of the first screw, the diameter of said web spiral being progressively larger. In this connection it has been found particularly advantageous to arrange the second screw extending into the hollow enlargement of the first screw in a rotatable manner, and driven on the output side, whereby the direction of both its rotational movement and its thread may be made opposite to those of the first screw.

DESCRIPTION OF THE DRAWINGS

Preferred embodiments of the invention are illustrated in the drawings, wherein.

DESCRIPTION OF PREFERRED EMBODIMENTS

Figure 1:
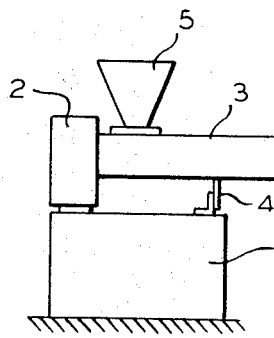
FIG. 1 is a side elevation of a screw press having a drive only on the input side.
Figure 2:
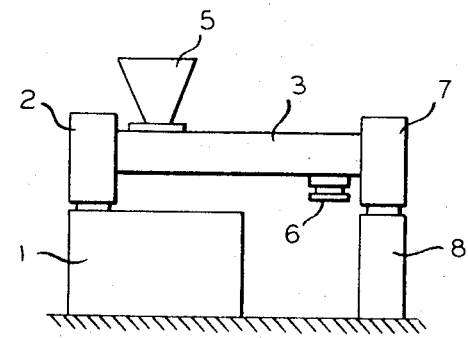
FIG. 2 is a side elevation of a screw press with a drive on both the input and output side.

FIGS. 1 and 2 show the general construction of two screw presses used with the subject invention. The screw press illustrated by FIG. 1 consists essentially of stand or base 1, power drive 2, screw cylinder 3 with support member 4, the filling or feed hopper 5 and mounting flange 6 for an extrusion nozzle or other tool of any given design (not shown). The extruder illustrated by FIG. 2 differs from that shown in FIG. 1 essentially by the presence of a second drive 7 arranged on the output side, which drives a second screw, and which is supported by auxiliary stand or base 8. Since in this case the melt leaves cylinder 3 radially, the mounting flange 6 is disposed on the periphery of cylinder 3 either on the lower side of said cylinder, as shown in FIG. 2, or on the upper side, or laterally on cylinder 3.

Figure 3:
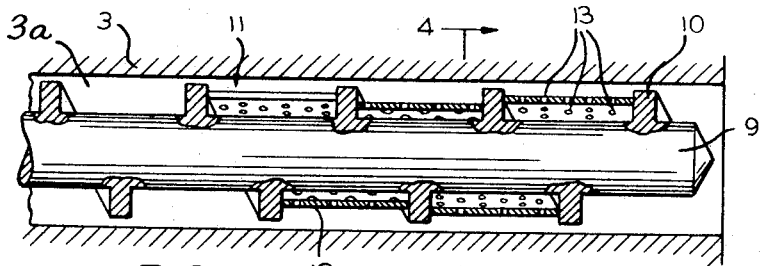
FIG. 3 shows a fragmentary section through a screw press having a screw with a normal conveying section and a first embodiment of a mixing zone.

In FIG. 3 the screw web or flight 10 is cut along the screw in the vertical center plane and, for the sake of clarity, omitted on the side toward the viewer. Screw core 9 and screw web 10 generally are made of one piece. The mixing zone 11 and its perforated dividing wall 12 begin at the downstream end of the conveying section 3a of the screw. The perforated dividing wall has a large number of passages or orifices 13, through which the molten material is pressed, during its travel through the mixing zone, alternately from the internal into the external passage and vice versa. This movement, which is oblique to the direction in which the melt is conveyed by the webs or flights 10, is brought about by the eccentric, helical path of dividing wall 12 about the screw core 9, as may be seen from FIGS. 3 and 4. Likewise, the dividing wall helical path in oval or elliptical cross section according to FIG. 6 provides a similar effect if used about the screw core 9 in FIG. 3.

Figure 5:
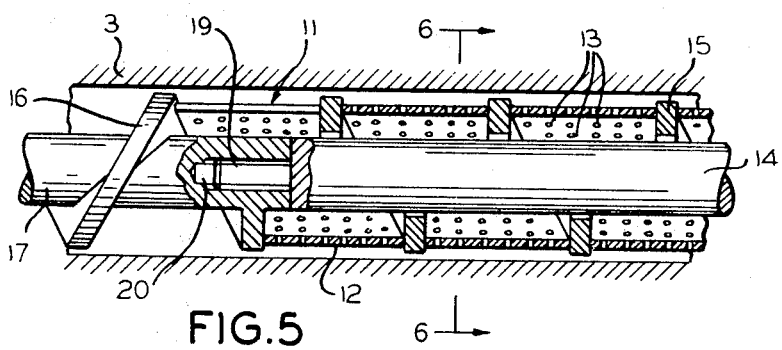
FIG. 5 shows a fragmentary section through the cylinder of a screw press having a screw wherein the conveying section and mixing zone are separable.

In the case of the embodiment shown in FIG. 5, screw core 14 and its web or flight 15 are separated from one another in the mixing zone 11. The helical web or flight 15 of the mixing zone and helical web or flight 16 of the conveying zone may be made of one piece, or they can also be connected with each other in a detachable manner (not shown). The screw core 14 in the mixing zone 11 may be connected, as shown in FIG. 5, in a detachable manner with core 17 of the conveying zone, for example by means of an axial, threaded pin 19 extending from core 14 into corresponding internal thread 20 of an axial bore in core 17. In the embodiment of FIG. 5, the downstream end of screw core 14 may terminate at the downstream end of the mixing zone 11. However, this version may also be modified in such a way that, instead of threaded pin 19, a trunnion is placed on screw core 14 and bore 20 in core 17 of the conveying zone is constructed as a slide bearing. In this case core 14 may be arranged in cylindrical housing 3 on the output side, and driven in the usual manner.

Figure 4:
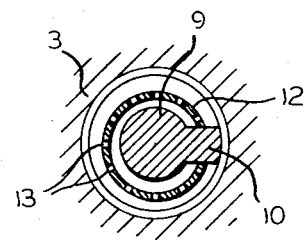
FIG. 4 is a section view taken on section plane 4—4 of FIG. 3.
Figure 6:
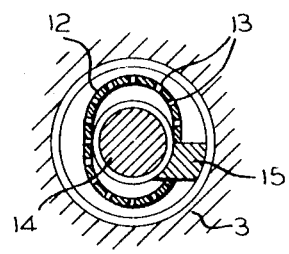
FIG. 6 is a section view taken on section plane 6—6 of FIG. 5.

FIG. 6 illustrates the substantially oval or elliptical arrangement of the dividing wall in transverse cross section. Through this substantially elliptical or oval orientation of dividing wall 12 around the cylindrical screw core 14, the molten material to be conveyed or mixed is pressed during its journey through the screw thread of the mixing zone alternately from the radially internal side to the radially external side and vice versa. In this way the intensive mixing effect aforedescribed in connection with the helically eccentric arrangement of FIG. 4 is achieved. The orientation of the dividing wall according to FIG. 4 would achieve the same result if applied to the embodiment shown in FIG. 5.

Figure 7:
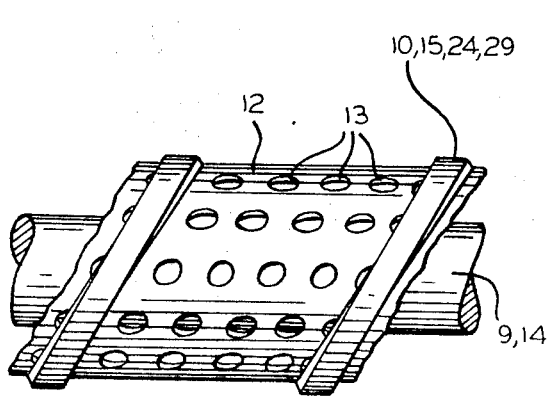
FIG. 7 is a fragmentary side elevation of a screw and perforated divider wall.
Figure 8:
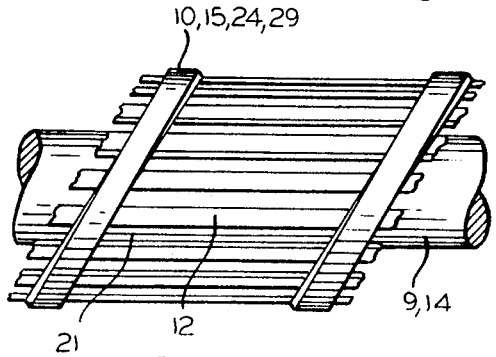
FIG. 8 is a similar side elevation of another embodiment of perforated divider wall.

The perforations or passages 13 and 21 shown in FIGS. 7 and 8 should be considered only as examples. The arrangement, number and diameter of holes 13 shown in FIG. 7 may vary. The width, shape and angular position of slits 21 with respect to screw web 10 should not be considered as limited to the embodiment of FIG. 8. For a cross section through FIG. 7 and FIG. 8, either of the dividing wall arrangements shown in FIGS. 4 and 6, respectively, may be used.

Figure 9:
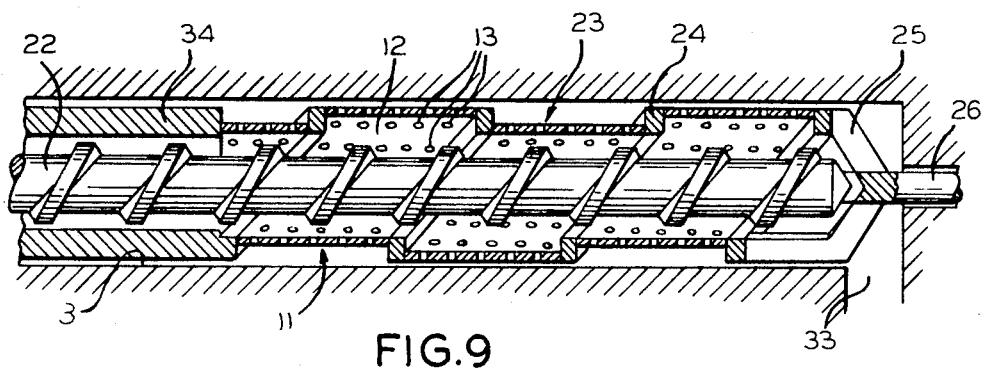
FIG. 9 is a fragmentary section through another embodiment of the invention.

Another embodiment of the present invention is shown in FIG. 9. The dimensions of main screw 22, as e.g., its outside diameter, core diameter, thread pitch, thread depth, web or flight width, etc., may be the same in the conveying and mixing zone. In this case the division into an internal and external passage by means of the perforated, helical wall 12 is carried out on a hollow, auxiliary screw 23 instead of on the main screw. The auxiliary screw 23 consists essentially of web or flight helix 24, the connecting ribs 25 and the bearing or driving shaft 26. To a certain extent, the auxiliary screw represents the extension of a tubular jacket 34. Jacket 34 surrounds the main screw 22 in the region of the conveying zone in such a way as to make it possible to develop the required conveying pressure in the plasticized mass. The thread formed by web helix 24 is again divided by means of perforated dividing wall 12 into an internal and an external passage. The web spiral 24 is constructed in such a way that it extends only over the region of the mixing zone and that it can be driven on the output side according to FIG. 2. On the other hand web spiral 24 can also be driven on the input side through tubular jacket 34. In the latter case jacket 34 exhibits, in the region of the filling hopper, windowlike perforations which permit the raw material to proceed to the conveying screw. The driving torque is transmitted, through the ribs between the windowlike perforations, to the tubular jacket and the adjoining web spiral 24. When the web spiral is driven on the output side, jacket 34 may end before the beginning of the filling zone. The mixing effect that can be achieved in this version is unusually good. The perforated, helical wall 12 is eccentric relative to the axis of rotation of main screw 22 and appears in transverse cross section like that of FIG. 4 (or of FIG. 6, if desired).

Figure 10:
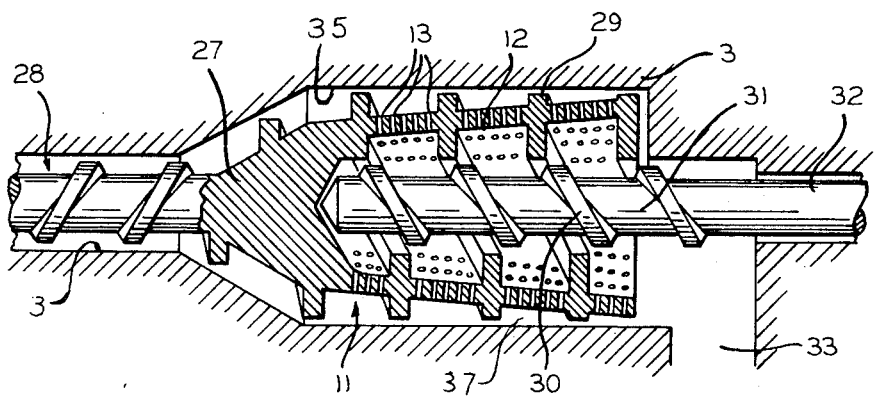
FIG. 10 is a fragmentary section through another embodiment of the invention.

A further modification of the present invention, with which a similarly good mixing effect has been achieved, is represented by FIG. 10. Core 27 of main screw 28 ends at the beginning of the mixing zone, in which said core then forms a hollow, flaring or bell-shaped perforated dividing wall with a varying distance from the internal wall 35 of the enlarged cylindrical, downstream end 37 of passage 3. In this case dividing wall 12 divides the thread of web of flight helix 29 into an internal and an external passage and may, as the case may be, correspond to the transverse cross sections shown in FIGS. 4 and 6. In this case, too, the oblique movement of the molten material takes place in both directions through the perforations. In addition, the melt is impelled by web or flight helix 30 of auxiliary screw 31 and then made turbulent or intensively mixed. The shaft of core 32 of screw 31 is arranged and driven on the output side of passages 3 and 35 of the screw housing, as shown in FIGS. 2 and 10. The direction of rotation and rotational speed of screws 28 and 31 may be different, as can be the direction of rotation of the threads. The radial discharge passage 33 discharges the well-mixed, substantially homogenous, plastic mass.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention I hereby claim as follows:

1. A screw press adapted for intimate mixing and homogenizing viscous materials and mixtures thereof which comprises a screw housing with a screw passage therein, said screw passage having a cylindrical conveying zone and a cylindrical mixing zone, a screw with a cylindrical screw core and helical screw flights extending axially of said passage and rotatable therein, a helical dividing wall radially outward of said screw core in said mixing zone, said helical dividing wall having a plurality of passages therethrough, and said helical dividing wall being positioned in said mixing zone with changing radial distance between said screw core and also the internal wall of said cylindrical passage of said mixing zone in the longitudinal direction of said mixing zone, thereby dividing the screw thread of said screw into internal and external passages of varying transverse cross section in the longitudinal direction of said mixing zone.

2. A screw press as claimed in claim 1, means separably mounting in the area of said mixing zone the screw core and its helical screw flight, means attaching said helical dividing wall in said mixing zone to said separable screw flight, and means detachably connecting at least one of said screw core and the screw flight in said mixing zone with the corresponding screw part in said conveying zone, whereby at least one of said screw core and said screw flight in said mixing zone may be separated to facilitate cleaning these parts in said mixing zone.

3. A screw press as claimed in claim 2, and means for rotatably supporting said separable screw flight in said mixing zone for rotation independently of said screw core in said mixing zone.

4. A screw press as claimed in claim 3 wherein said separable screw flight is rotatably supported by a shaft on the downstream, output end of said screw passage, and drive means for rotatably driving said separable screw flight.

5. A screw press as claimed in claim 1 wherein said helical dividing wall is cylindrical in transverse cross section and eccentric relative to said screw core.

6. A screw press as claimed in claim 1 wherein said helical dividing wall is substantially oval or elliptical in transverse cross section.

7. A screw press as claimed in claim 1 wherein said screw and its helical flights extend axially through said conveying zone and said mixing zone and wherein said helical dividing wall is supported by a hollow, helical screw thread surrounding said first-mentioned screw in said mixing zone, and means for rotatably driving said hollow screw thread and helical dividing wall independently of said first-mentioned screw.

8. A screw press as claimed in claim 1 wherein the diameter of said screw passage in said mixing zone is larger than the diameter of said screw passage in said conveying zone, a hollow, conically flaring wall in said mixing zone connected to and driven by said screw core, helical screw flights on said conically flaring wall and passages in said wall between said screw flights, and a second screw driven independently of said first-mentioned screw extending substantially coaxially into the hollow portion of said conically flaring wall.

9. A screw press as claimed in claim 8 wherein said second screw is driven by means on the downstream, output end of said mixing zone, said second screw having helical flights of opposite hand to the helical flights in said first-mentioned screw and said conically flaring wall.

10. A screw press as claimed in claim 1 wherein the screw core of the mixing zone is separated not only from the screw core of the conveying zone but also from the screw flight in the mixing zone and is supported independently rotatably and drivable at the output side of the press.